(12) United States Patent
Kuehl et al.

(10) Patent No.: US 8,430,221 B2
(45) Date of Patent: Apr. 30, 2013

(54) MECHANICALLY ENERGIZED MECHANICAL POWER COUPLING SYSTEM

(75) Inventors: Steven J. Kuehl, Stevensville, MI (US); Richard A. McCoy, Stevensville, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 579 days.

(21) Appl. No.: 12/643,200

(22) Filed: Dec. 21, 2009

(65) Prior Publication Data

US 2011/0147161 A1    Jun. 23, 2011

(51) Int. Cl.
*F16D 23/12*    (2006.01)

(52) U.S. Cl.
USPC ....... 192/66.1; 192/30 W; 192/34; 192/114 R

(58) Field of Classification Search ................... 192/66.1
See application file for complete search history.

(56) References Cited

U.S. PATENT DOCUMENTS

| | | | |
|---|---|---|---|
| 1,958,206 A * | 5/1934 | Rubsam | ..................... 62/163 |
| 3,101,984 A | 8/1963 | Wieckmann | |
| 3,258,553 A | 6/1966 | Breslin | |
| 3,710,060 A | 1/1973 | Brevick | |
| 4,068,179 A | 1/1978 | Sample et al. | |
| 4,148,536 A | 4/1979 | Petropoulsos et al. | |
| 4,317,969 A | 3/1982 | Riegler et al. | |
| 4,445,743 A | 5/1984 | Bakker | |
| 4,591,732 A | 5/1986 | Neuenschwander | |
| 4,604,505 A | 8/1986 | Henninger | |
| 4,663,542 A | 5/1987 | Buck et al. | |
| 4,844,582 A | 7/1989 | Giannini | |
| 4,964,891 A | 10/1990 | Schaefer | |
| 5,031,258 A | 7/1991 | Shaw | |
| 5,207,148 A | 5/1993 | Anderson et al. | |
| 5,385,468 A | 1/1995 | Verderber | |
| 5,433,623 A | 7/1995 | Wakata et al. | |
| 5,713,752 A | 2/1998 | Leong et al. | |
| 5,828,341 A | 10/1998 | Delamater | |
| 6,176,718 B1 | 1/2001 | Skarie et al. | |
| 6,183,264 B1 | 2/2001 | Harsanyi | |
| 6,350,148 B1 | 2/2002 | Bartolutti et al. | |
| 6,359,270 B1 | 3/2002 | Bridson | |
| 6,428,334 B1 | 8/2002 | Skarie et al. | |
| 6,534,951 B2 | 3/2003 | Kawashima | |
| 6,559,882 B1 | 5/2003 | Kerchner | |

(Continued)

FOREIGN PATENT DOCUMENTS

| | | |
|---|---|---|
| EP | 0868077 A2 | 9/1998 |
| JP | 60033716 A | 2/1985 |

(Continued)

*Primary Examiner* — Rodney Bonck
(74) *Attorney, Agent, or Firm* — Clifton G. Green; McGarry Bair PC

(57) ABSTRACT

A system for communicating a mechanical power service between mechanical power service communicating devices. A service switch is provided for selectively transferring the mechanical power service from a first mechanical power service communicating device, such as a host or other mechanical power service provider or source, to a second mechanical power service communicating device, such as an accessory device or other mechanical power service consumer. The service switch is activated to communicate the mechanical power service between the first mechanical power service communicating device and the second mechanical power service communicating device in response to movement of a component associated with one of the mechanical power service communicating devices.

29 Claims, 8 Drawing Sheets

U.S. PATENT DOCUMENTS

| | | |
|---|---|---|
| 6,685,491 B2 | 2/2004 | Gergek |
| 6,969,928 B2 | 11/2005 | Hanson |
| 6,981,695 B1 | 1/2006 | Hedlund et al. |
| 6,986,263 B2 | 1/2006 | Crisp, III |
| 7,024,717 B2 | 4/2006 | Hilscher et al. |
| 7,201,005 B2 | 4/2007 | Voglewede et al. |
| 7,207,080 B2 | 4/2007 | Hilscher et al. |
| 7,209,038 B1 | 4/2007 | Deconinck et al. |
| 7,264,026 B2 | 9/2007 | Gruber et al. |
| 7,291,032 B1 | 11/2007 | Carver et al. |
| 7,354,292 B1 | 4/2008 | Lloyd et al. |
| 7,404,298 B2 | 7/2008 | Kim et al. |
| 7,493,926 B2 | 2/2009 | Weglin |
| 7,584,030 B1 | 9/2009 | Graham |
| 7,618,295 B2 | 11/2009 | McCoy |
| 7,625,246 B2 | 12/2009 | McCoy et al. |
| 7,639,485 B2 | 12/2009 | McCoy |
| 7,651,368 B2 | 1/2010 | Kendall et al. |
| 7,686,127 B2 | 3/2010 | LeClear et al. |
| 7,713,090 B2 | 5/2010 | Kendall et al. |
| 7,740,505 B2 | 6/2010 | McCoy |
| 7,740,506 B2 | 6/2010 | McCoy |
| 7,748,494 B2 | 7/2010 | LeClear et al. |
| 7,751,184 B2 | 7/2010 | McCoy |
| 7,765,332 B2 | 7/2010 | McCoy et al. |
| 7,798,865 B2 | 9/2010 | McCoy et al. |
| 7,810,343 B2 | 10/2010 | McCoy et al. |
| 7,826,203 B2 | 11/2010 | McCoy |
| 7,841,907 B2 | 11/2010 | McCoy |
| 7,843,697 B2 | 11/2010 | McCoy et al. |
| 7,852,619 B2 | 12/2010 | McCoy |
| 7,865,639 B2 | 1/2011 | McCoy et al. |
| 7,869,201 B2 | 1/2011 | McCoy et al. |
| 7,870,753 B2 | 1/2011 | Marcy et al. |
| 7,871,300 B2 | 1/2011 | McCoy et al. |
| 7,898,812 B2 | 3/2011 | McCoy et al. |
| 7,903,397 B2 | 3/2011 | McCoy |
| 7,916,336 B2 | 3/2011 | Silverbrook et al. |
| 7,931,114 B2 | 4/2011 | LeClear et al. |
| 7,934,958 B2 | 5/2011 | Kendall et al. |
| 7,980,088 B2 | 7/2011 | LeClear et al. |
| 8,008,586 B2 * | 8/2011 | Kuehl et al. ............ 200/51 R |
| 8,035,958 B2 | 10/2011 | Kendall et al. |
| 8,040,666 B2 | 10/2011 | McCoy et al. |
| 8,151,016 B2 | 4/2012 | McCoy |
| 2002/0022991 A1 | 2/2002 | Sharood et al. |
| 2003/0037447 A1 | 2/2003 | Gruber et al. |
| 2003/0154338 A1 | 8/2003 | Boz et al. |
| 2004/0036273 A1 | 2/2004 | McClary |
| 2004/0154318 A1 | 8/2004 | Roh et al. |
| 2005/0011205 A1 | 1/2005 | Holmes et al. |
| 2006/0053655 A1 | 3/2006 | Weglin |
| 2006/0118694 A1 | 6/2006 | Lee et al. |
| 2006/0125360 A1 | 6/2006 | Kim et al. |
| 2006/0168236 A1 | 7/2006 | Higuma et al. |
| 2006/0187080 A1 | 8/2006 | Slatter |
| 2007/0086151 A1 | 4/2007 | Oh et al. |
| 2008/0065289 A1 | 3/2008 | Bertosa et al. |
| 2008/0125911 A1 | 5/2008 | Ebrom et al. |
| 2008/0164224 A1 | 7/2008 | McCoy et al. |
| 2008/0164225 A1 | 7/2008 | McCoy |
| 2008/0164226 A1 | 7/2008 | McCoy et al. |
| 2008/0164227 A1 | 7/2008 | LeClear et al. |
| 2008/0164796 A1 | 7/2008 | McCoy et al. |
| 2008/0165282 A1 | 7/2008 | Marcy et al. |
| 2008/0165474 A1 | 7/2008 | McCoy et al. |
| 2008/0165475 A1 | 7/2008 | McCoy et al. |
| 2008/0165476 A1 | 7/2008 | McCoy et al. |
| 2008/0165478 A1 | 7/2008 | McCoy |
| 2008/0165505 A1 | 7/2008 | McCoy et al. |
| 2008/0165509 A1 | 7/2008 | Kendall et al. |
| 2008/0165998 A1 | 7/2008 | LeClear et al. |
| 2008/0166895 A1 | 7/2008 | McCoy et al. |
| 2008/0166915 A1 | 7/2008 | Kendall et al. |
| 2008/0168205 A1 | 7/2008 | McCoy et al. |
| 2008/0192411 A1 | 8/2008 | McCoy |
| 2008/0201032 A1 | 8/2008 | Fayyad et al. |
| 2008/0222327 A1 | 9/2008 | McCoy et al. |
| 2008/0231464 A1 | 9/2008 | Lewis et al. |
| 2008/0231764 A1 | 9/2008 | Kendall et al. |
| 2008/0232053 A1 | 9/2008 | Kendall et al. |
| 2008/0247141 A1 | 10/2008 | Kendall et al. |
| 2008/0287009 A1 | 11/2008 | Mccoy |
| 2009/0009316 A1 | 1/2009 | Kendall et al. |
| 2009/0047824 A1 | 2/2009 | Seibert et al. |
| 2009/0054804 A1 | 2/2009 | Gharib et al. |
| 2009/0161579 A1 | 6/2009 | Saaranen et al. |
| 2010/0120284 A1 | 5/2010 | Oka et al. |
| 2010/0182753 A1 | 7/2010 | Kendall et al. |
| 2010/0248546 A1 | 9/2010 | McCoy |
| 2011/0049308 A1 | 3/2011 | Beaman et al. |
| 2011/0146328 A1 | 6/2011 | Hendrickson et al. |
| 2011/0146329 A1 | 6/2011 | Kuehl et al. |
| 2011/0146330 A1 | 6/2011 | Kuehl et al. |
| 2011/0146819 A1 | 6/2011 | Hendrickson et al. |
| 2011/0147159 A1 | 6/2011 | Kuehl et al. |
| 2011/0147160 A1 * | 6/2011 | Kuehl et al. ............ 192/82 R |
| 2011/0147161 A1 | 6/2011 | Kuehl et al. |
| 2011/0147417 A1 | 6/2011 | Kuehl |
| 2011/0148216 A1 | 6/2011 | McCoy |
| 2011/0148223 A1 | 6/2011 | McCoy |
| 2011/0148649 A1 | 6/2011 | de Cavalcanti et al. |
| 2011/0148650 A1 | 6/2011 | Jenkins et al. |
| 2011/0148651 A1 | 6/2011 | Hendrickson et al. |
| 2011/0149485 A1 | 6/2011 | Kuehl et al. |
| 2011/0152024 A1 | 6/2011 | Kuehl |
| 2011/0153739 A1 | 6/2011 | McCoy |
| 2011/0153821 A1 | 6/2011 | McCoy |
| 2011/0153871 A1 | 6/2011 | Ferragut, II et al. |
| 2011/0153880 A1 | 6/2011 | McCoy |

FOREIGN PATENT DOCUMENTS

| | | |
|---|---|---|
| JP | 06310202 A | 11/1994 |
| JP | 06310204 A | 11/1994 |
| JP | 06333633 A | 12/1994 |
| JP | 2007080584 A | 3/2007 |
| WO | 2007/015274 A1 | 2/2007 |

* cited by examiner

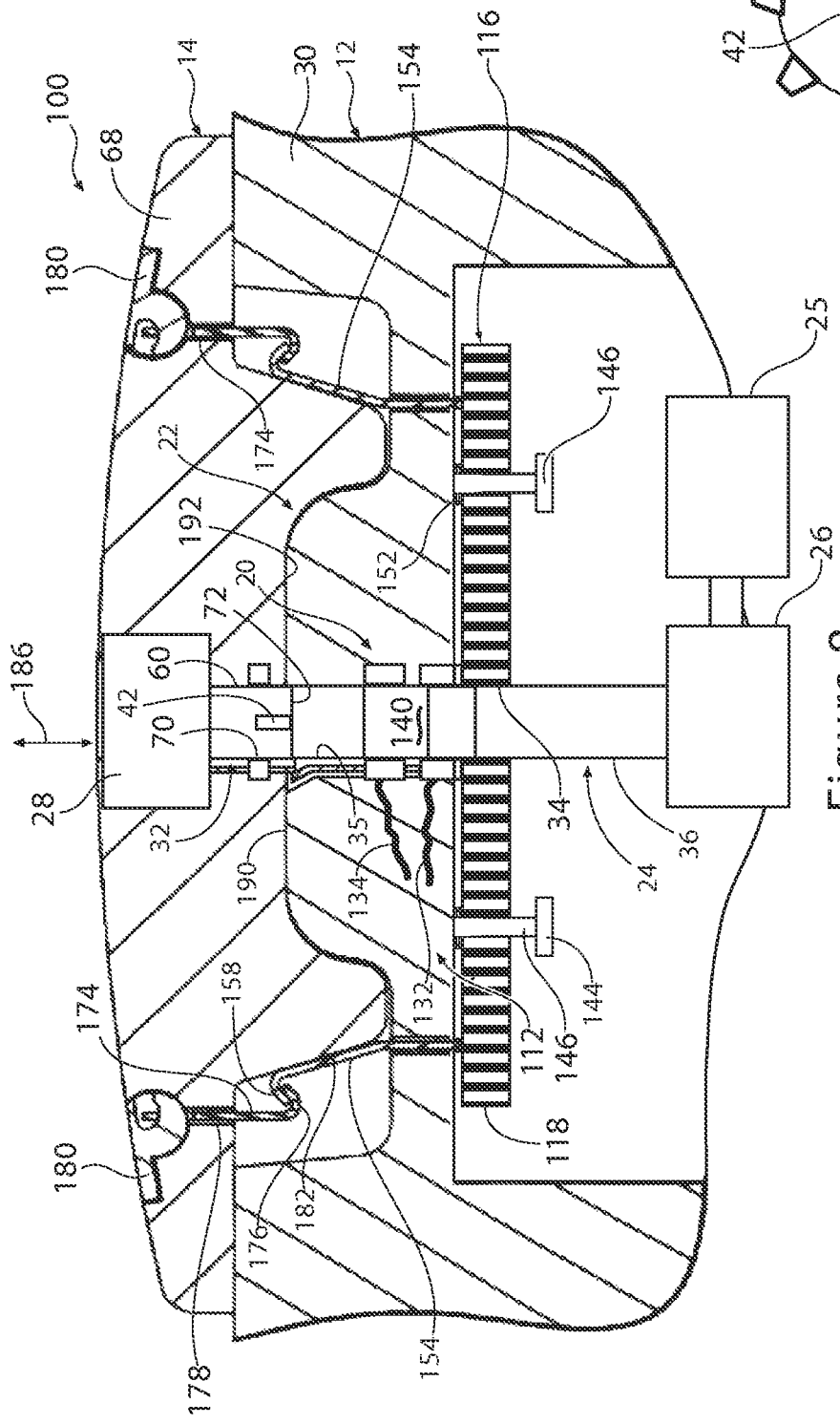
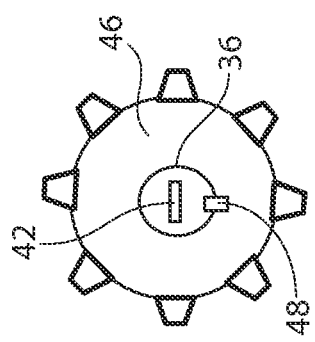
Figure 8
Figure 9

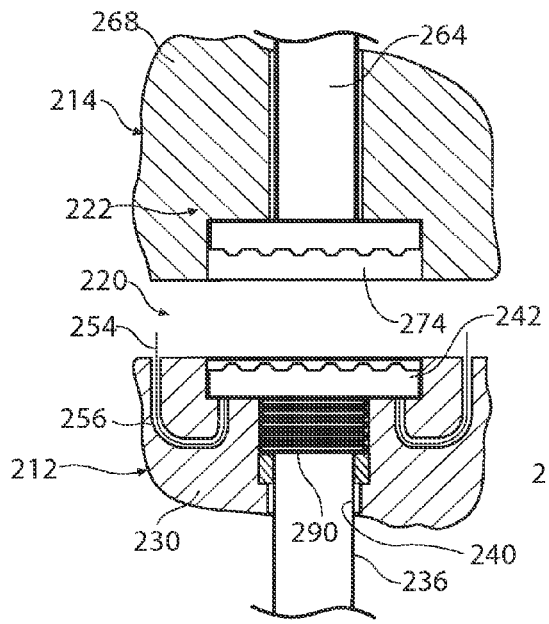
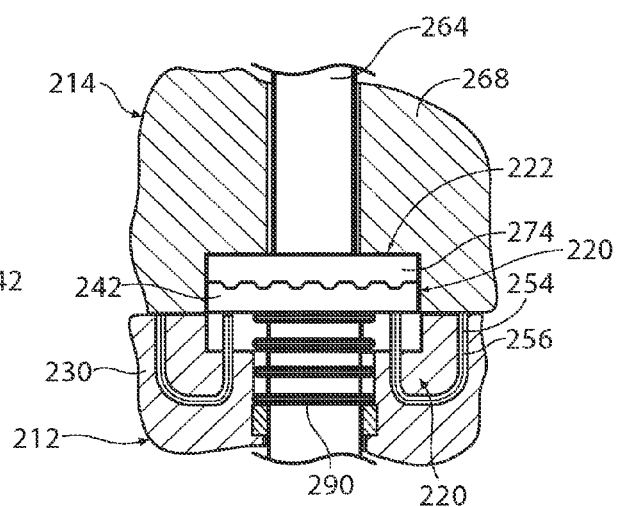
Figure 10
Figure 11
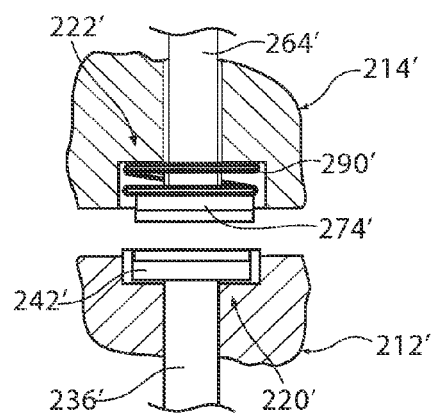
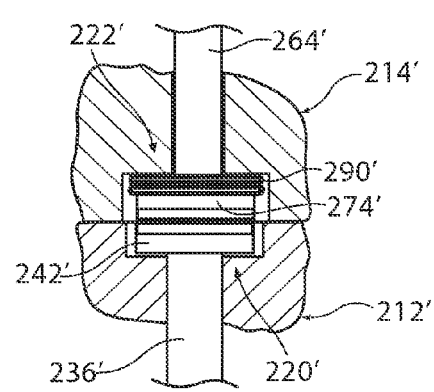
Figure 12
Figure 13

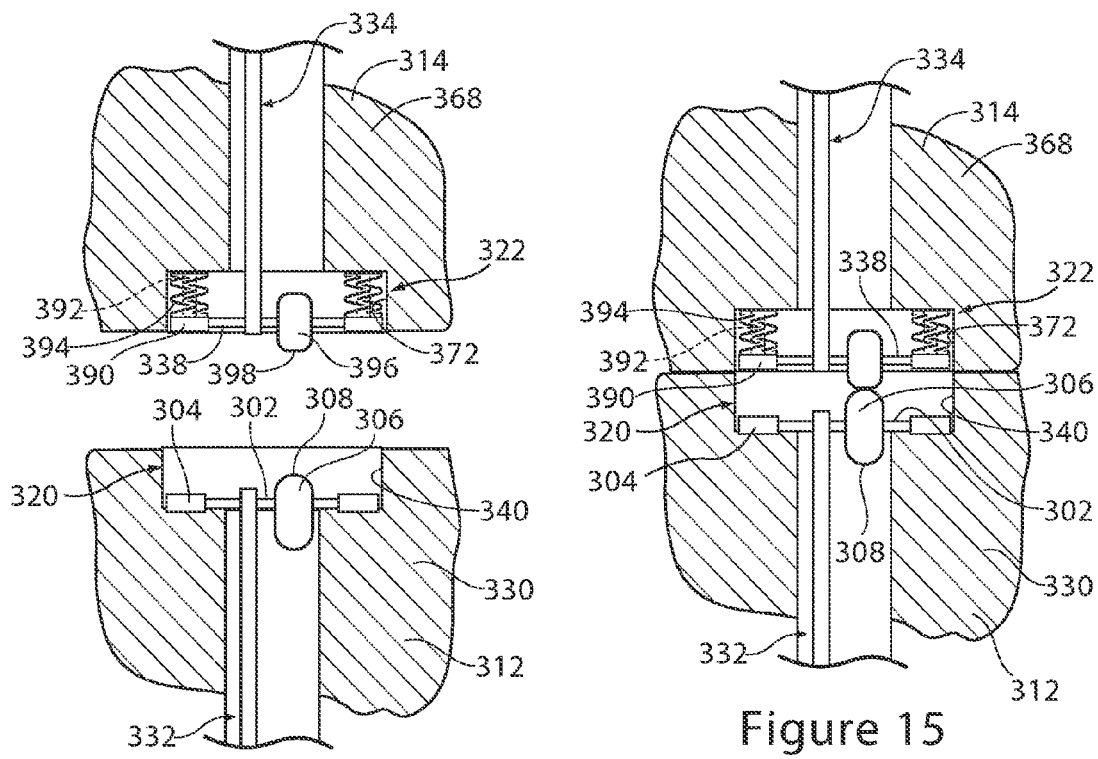
Figure 14
Figure 15
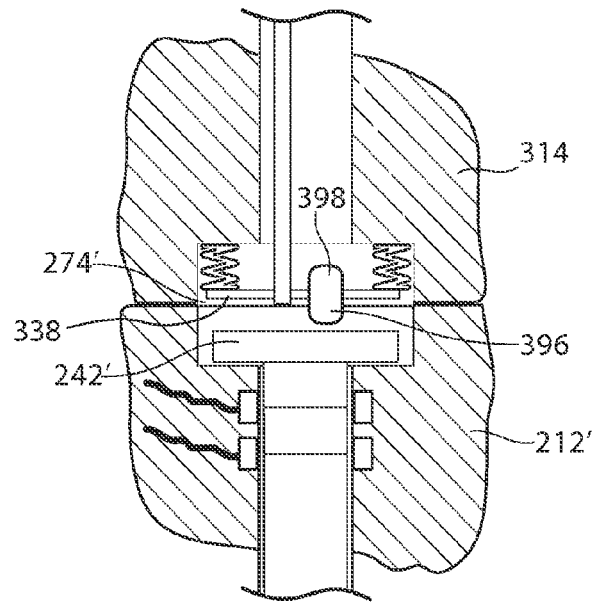
Figure 16

MECHANICALLY ENERGIZED MECHANICAL POWER COUPLING SYSTEM

BACKGROUND

Appliances and other useful household equipment are increasingly designed to interact with one another, as well as with a variety of consumer accessory devices. A consumer accessory device may be used, for example, in conjunction with an appliance to enhance or supplement the functionality of the appliance.

BRIEF SUMMARY

The invention relates to mechanical power coupling systems for connecting mechanical power service communicating devices, such as coupling portable devices to a host, and more particularly to systems for communicating a mechanical power service between mechanical power service communicating devices.

According to one aspect of the invention, a mechanical power coupling system comprises a first service connector component, a service switch operably connected to a mechanical power service source, the service switch operable for selectively transferring a mechanical power service from the mechanical power service source to the first service connector component, the service switch including a first link moveably associated with the service switch, and a second service connector component operably connectable to the first service connector component, the second service connector component including a second link associated with the second service connector component and engageable with the first link of the service switch, wherein the service switch is selectively activated to transfer a mechanical power service from the first service connector component to the second service connector component in response to movement of the first link when engaged with the second link.

According to another aspect of the invention, a system couples with a mechanical power service communicating device and comprises a first service connector component operably engageable with a separate second service connector component for transferring a mechanical power service from a mechanical power service source to the second service connector component, and a service switch for selectively connecting the first service connector component to the mechanical power service source, the service switch including a first link engageable with a second link associated with the second service connector component, wherein the service switch is activated to transfer a mechanical power service from the mechanical power service source to the first service connector component in response to movement of the first link associated with the second service connector component.

According to yet another aspect of the invention, a system for receiving a mechanical power service from a host comprises a second service connector component operably engageable with a separate first service connector component for selectively receiving a mechanical power service from a mechanical power service source, and an actuator operably associated with the second service connector component, the actuator moveable along a path generally parallel to an axis of insertion of the second service connector component with the first service connector component, between a first position and a second position, wherein the mechanical power service is delivered to the second service connector component when the actuator is in the first position.

According to still another aspect of the invention, an adapter removably couples an accessory device having a first device mechanical power connector component to a host having a mechanical power service provider, a first host mechanical power connector component, and a service switch selectively providing a mechanical power service to the first mechanical power coupling system. The adapter comprises a second host mechanical power connector component engageable with the first host mechanical power connector component, a second device mechanical power connector component engageable with the first device mechanical power connector component, a mechanical power service communication service pathway operably interconnecting the second host mechanical power connector component and the second device mechanical power connector component for the transfer of a mechanical power service there along, and a first link engageable with a second link associated with the service switch, wherein the service switch is activated in response to movement of the first link.

BRIEF DESCRIPTION OF THE DRAWINGS

In the drawings:

FIG. 8 is a partial cross-sectional view of similar to FIG. 6, showing the mechanical power communicating components of the accessory device engaged with the mechanical power communicating components of the host in a latched state.

FIG. 9 is a top plan view of a power communicating shaft of the host of FIGS. 6 through 8.

FIGS. 10 and 11 are enlarged views of a second embodiment of the invention, showing mechanical power connector components for communicating mechanical power service between an accessory device and a host shown in a disengaged condition and an engaged condition, respectively.

FIGS. 12 and 13 are enlarged views of a third embodiment of the invention, showing mechanical power connector components for communicating mechanical power service between an accessory device and a host shown in a disengaged condition and an engaged condition, respectively.

FIGS. 14 and 15 are enlarged view of a fourth embodiment of the invention, showing mechanical power connector components for communicating mechanical power service between an accessory device and a host shown in a disengaged condition and an engaged condition, respectively.

FIG. 16 is an enlarged view of a fifth embodiment of the invention, mechanical power connector components for communicating mechanical power service between an accessory device and a host shown in an engaged condition.

DETAILED DESCRIPTION

Figure 1:
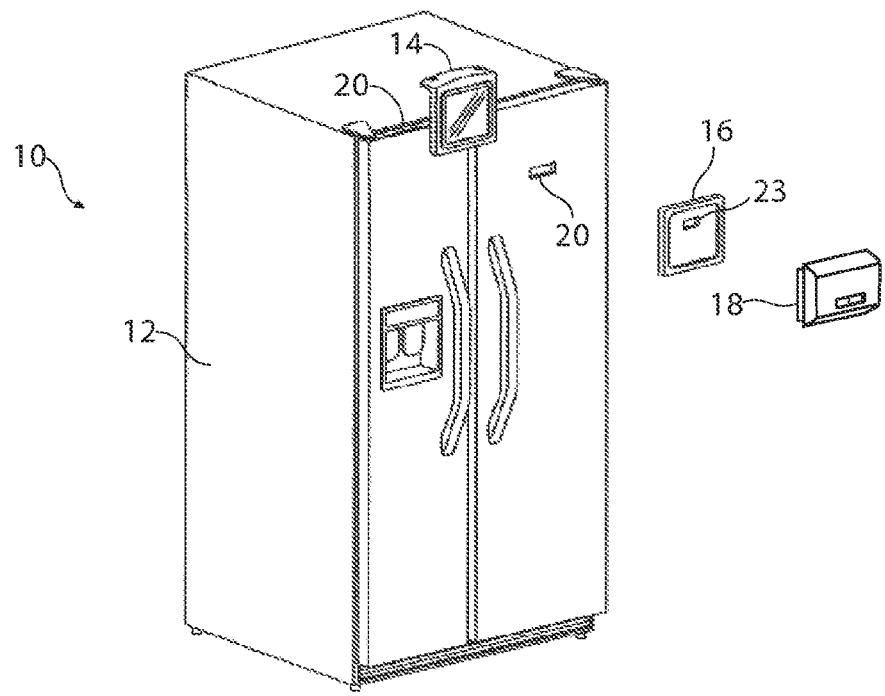
FIG. 1 is a perspective view of a modular system according to one embodiment of the invention employing a mechanically energized mechanical power coupling system for connecting an accessory device to a host.

Referring now to the discussion that follows and also to the drawings, illustrative approaches to the disclosed systems and methods are shown in detail. Although the drawings represent some possible approaches, the drawings are not necessarily to scale and certain features may be exaggerated, removed, or partially sectioned to better illustrate and explain the present invention. Further, the descriptions set forth herein are not intended to be exhaustive or to otherwise limit or restrict the claims to the precise forms and configurations shown in the drawings and disclosed in the following detailed description.

The drawings and the following detailed description relate generally to mechanical power coupling systems for coupling a mechanical power service provider with a mechanical power service supplier. The following definitions apply to terms that may be used in the specification and the claims, unless otherwise noted.

As used herein, a "mechanical power service" is mechanical power or mechanical movement that may be communicated from one device to another.

As used herein, "mechanical power communication" is a useful provision of a mechanical power service from one device to another device. Communicating a mechanical power service means supplying or receiving a mechanical power service. As used herein, communication of mechanical power service includes both uni-directional and multi-directional communication between any two devices, either directly or through an adapter, as defined herein. For example, mechanical power communication accomplished through interengaging gears, wheels, plates, levers, or chains.

The terms "provide" and "supply" and any variation thereof, are used herein to denote a source of the mechanical power service relative to a device receiving the mechanical power service. Neither term is limited to the original source of the mechanical power service. A device that provides or supplies the mechanical power service may simply be passing on the mechanical power service from the original source. For example, a device that provides power from a rotating wheel or gear may pass on to another device power in the form of a translating belt.

The term "receive" and any variation thereof, is used herein to denote a receipt of the mechanical power service relative to the device providing the mechanical power service. The term is not limited to the ultimate consumer of the mechanical power service. A device that receives the mechanical power service may simply be passing on the mechanical power service from the source, such as transmission, to a device that will consume, as hereinafter defined, the mechanical power service. The device which receives a mechanical power service is not necessarily the end consumer of the mechanical power service.

The term "consume" and any variation thereof, as used herein, denotes the act of employing, using, storing, or dispensing at least a portion of the mechanical power service received in connection with performing a function.

The term "coupled" and any variation thereof, as used herein, includes any type of connection that permits transfer of a mechanical power service between two devices. The term "coupled" includes both fixed and removable coupling, as well as both continuous and intermittent coupling.

The term "useful device" and any variation thereof, as used herein, is a device that is capable of performing a useful physical or virtual function either alone or in combination with another device.

The term "mechanical power service consumer" and any variation thereof, as used herein, is any useful device that employs, uses, stores, or dispenses a mechanical power service in connection with performing a physical or virtual function. A mechanical power service consumer may be, for example, a smart utensil, an appliance, a resource controller, a dispenser, a detergent dispenser, a drink dispenser, a mixer, a fan, a blender, or a cycle accessory.

The term "mechanical power service provider" and any variation thereof, as used herein, is any device that is capable of providing or supplying a mechanical power service to another device.

A "mechanical power service communicating device" used herein is any device that is capable of communicating a mechanical power service with another device, and may be a mechanical power service provider or a mechanical power service consumer.

As used herein, the term "host" is an apparatus that has a primary function independent of providing a mechanical power service. A host may be a mechanical power service provider, a mechanical power service consumer, or both. For example, the host may be an appliance and the primary function can be performing a series of steps to conduct a useful cycle of operation. The appliance may be a conventional household appliance, such as a refrigerator performing a cooling cycle or an ice making cycle. Other examples of appliances that may be hosts include, but are not limited to, a freezer, a conventional oven, a microwave oven, a dishwashing machine, a stove, a range, an air conditioner, a dehumidifier, a clothes washing machine, a clothes dryer, a clothes refreshing machine, and a non-aqueous washing apparatus, or any combination thereof. Alternatively, the host may be a fixture such as a water softener, a water heater, a furnace, pool water treatment equipment, or an HVAC system. The host may be a small device such as a blender, a mixer, a trash compactor, a vacuum cleaner, or a robot. A host can alternatively comprise a structural feature of a building, such as a wall, cabinet, or door. The host may also provide other services, such as electrical power, electronic data, substance handling, illumination, heat, or sound.

As used herein, the terms "accessory" or an "accessory device" refer to any useful device which may be coupled to a host and communicate a mechanical power service to or from the host. An accessory device may be used primarily in conjunction with a host to enhance, supplement, regulate, or monitor the functionality of the host or may have independent functionality and utility. An accessory device may be a mechanical power service provider, a mechanical power service consumer, or both. Examples of an accessory device include, but are not limited to, a water dispenser, a fan, a motor, a tissue dispenser, a can opener, a mixer, a blender, an ice dispenser, an ice cream maker, an icemaker, a coffee maker, a paper product dispenser, a dry goods dispenser, a bottle opener, a liquid dispenser, and a pill dispenser. An accessory may be a mechanical power service provider, a mechanical power service consumer, or both.

As used herein, the term "portable device" is an accessory device that is designed to be moveable by a user during its useful life between a use location and a storage location or alternative use location.

As used herein, the term "independent device" is a useful device that provides a useful function without being connected to a mechanical power service provider. In some cases, the primary function of the independent device is different from the primary function of the host from which the independent device may receive a mechanical power service. The independent device may be an accessory device.

As used herein, the term "dependent device" is a useful device that provides a useful function only when connected to a mechanical power service provider. A dependent device may be a mechanical power service consumer. Examples of a dependent device that may be coupled to a host include, but are not limited to, a smart pan or pot, an icemaker, and a bulk detergent dispenser.

A "service connector system" as used herein is a connector system having at least two separate service connector components, each of which is associated with a useful device. The service connector components cooperate with one another to couple the useful devices to facilitate communication of a service between the useful devices. A service connector system may carry multiple services. An electromagnetic service connector system, for example, may be associated with or incorporated into a mechanical power service connector system, or may be independent of a mechanical power service connector system but be associated with the same mechanical power service provider or mechanical power service consumer.

As used herein, the term "mechanical power coupling system" or "mechanical power service connector system" is a service connector system having at least two separate mechanical power service connector components, each associated with a useful device. The mechanical power service connector components cooperate with one another to couple the useful devices to facilitate communication of a mechanical power service between the useful devices. A "mechanical power service connector component" may alternately be referred to as simply a "mechanical power connector component".

As used herein, the term "switched mechanical power coupling system" is a mechanical power coupling system having switching capability in at least one of the mechanical power service connector components operable to selectively control the communication of a mechanical power service between the components of the mechanical power coupling system.

As used herein, the term "mechanical power service switch" is any component used to selectively regulate the communication of a mechanical power service between components of a mechanical power service coupling system, and may comprise, but is not limited to, a switch, a motor, a fan, or a controller for controlling such devices. A mechanical power service switch may be associated with switching more than one type of service. For example, a mechanical power service switch may be associated with, integrated with, or comprise an electromagnetic service switch.

"Wireless" refers to a type of communication in which power and/or data is transferred over a distance without the use of electrical conductors or wires. For example, electromagnetic waves, light waves, or acoustic waves can be used to carry power and/or data over a distance without using electrical conductors or wires.

A "proximity target" as used herein is any component or device that may be detected when positioned within range of an associated proximity sensor, defined below. A proximity target may be passive, such as visual target or a proximity target formed of magnetic or magnetic responsive material. Other examples of passive proximity targets may include a conductive component or surface capable of cooperating with a magnetic field, a current, or a voltage provided by a proximity sensor. A proximity target may alternatively be active or powered such as an electromagnet, a generator of a magnetic field, a current, a voltage or an acoustic wave. An active proximity target may alternatively provide a powered readable display or dispense a detectable chemical.

A "proximity sensor" as used herein is any component or device that may detect an associated proximity target when the proximity target is within arrange of the proximity sensor. A proximity sensor may detect, for example, a change in an electromagnetic field, an electromagnetic wave, an acoustic wave, a visual target a chemical component, an electrical signal, a change in voltage, a change in current, a change in frequency, a change in resistance, a change in inductance, a change in capacitance, a mechanical signal, a change in pressure, a displacement, a vibration, and the presence of a chemical. A proximity sensor may be active or passive, such as a magnetic sensor of magnetic or magnet responsive material, or may alternatively be active. Examples of active sensors include active magnetic sensors, light sensors, optical sensors, acoustic sensors, electromagnetic sensors, chemical sensors and thermal sensors. Examples of magnetic sensors include magnets and magnetic responsive components. Examples of optical sensors include infrared sensors, photoelectric sensors, fiber optic sensors, photo resistors, photovoltaic sensors, photo diodes and cameras. Examples of electromagnetic sensors include radio receivers, radar sensors, Hall Effect sensors, inductive sensors, capacitive sensors, variable reluctance sensors and eddy current sensors. Examples of acoustic sensors include ultrasonic sensors and microphones. A "contact proximity sensor" detects a proximity target by touching the proximity target. A "contactless proximity sensor" detects the target through a wireless or contactless means. For example, magnetic flux can be used as the signaling mechanism between a contactless proximity sensor and a contactless proximity target.

As used herein, the term "proximity system" is a system that uses a "proximity switch" operated by a plurality of "proximity coupling components," each associated with a different parent device, for determining that the parent devices are in proximity with each other. Parent devices are usually paired, examples of which include a service provide and a service consumer, a host and an accessory device, and a host and an adapter. Proximity coupling components may include a proximity target associated with one parent device to actively or passively provide an indication of the presence of the one parent device and a proximity sensor associated with the other parent device responsive to the presence of the proximity target to activate the proximity switch. The proximity switch may be used to provide a signal or message indicative of the proximity of two parent devices or may directly or indirectly regulate the communication of a service along a service pathway.

As used herein, the term "plug" is a generally male mechanical power service connection component.

As used herein, the term "receptacle" is a generally female mechanical power service connection component.

As used herein, the term "mechanical power service pathway" refers to a pathway for transferring a mechanical power service from one location to another. The mechanical power service pathway may have any of a variety of configurations depending on the type of mechanical power service being transferred, including but not limited to a shaft, a cable, a chain, or a belt.

As used herein, the term "adapter" is an intermediate device that may be provided between a first and second useful device, such as between a host and an accessory, to facilitate the communication of mechanical power services between the first and second useful devices. An adapter may receive a mechanical power service from the first useful device and provide the mechanical power service or a modified version of the mechanical power service to the second useful device, for example, by modifying the rotational speed at which mechanical power is delivered or by changing rotational motion into translational motion. In some applications, multiple adapters may be interposed between two useful devices. In other applications, three or more useful devices may be coupled to a single adapter, such as multiple accessories for a host. In some applications, the adapter may itself be a useful device providing a useful function not provided by the other useful device or devices coupled to it. An adapter may optionally include a transformative component that transforms a service from a service provider to a different service, which is supplied to a service consumer. This may be useful when the service from the service provider is not compatible with the service consumer. The transformative component can be configured to transform the service into a compatible form for the service consumer. Examples of transformative components are protocol converters, power transformers, or other devices that convert substance, energy, or data from a first form to a second form.

As used herein, the term "functional unit" is the combination of any adapter coupled to an accessory, which together provide a functionality that neither the adapter nor the accessory can alone provide. Any functional unit itself is also included within the meaning of the term "useful device".

Figure 2:
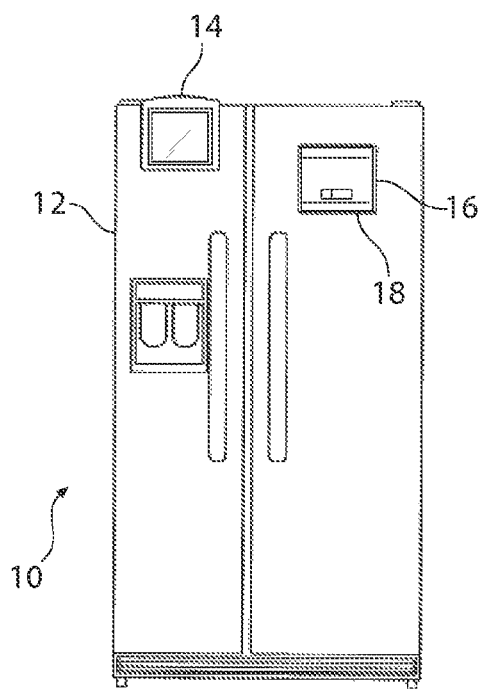
FIG. 2 is a front elevational view of the modular system of FIG. 1, showing the accessory devices attached to the host.
Figure 3:
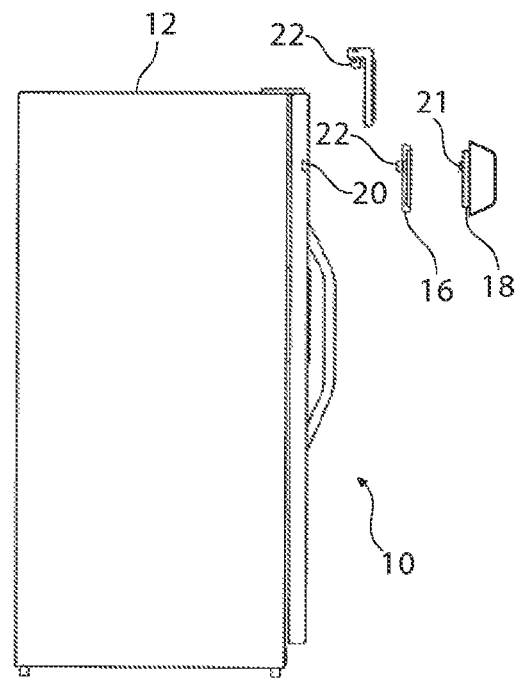
FIG. 3 is a side elevational view of the modular system of FIG. 1, showing the accessory devices removed from the host.

Referring now to FIGS. 1 through 3, a schematic illustration of a modular system 10 according to one embodiment of the invention is shown to include at least one host 12 and at least one accessory device 14 that can be coupled to host 12. The hose may be a mechanical power service provider, and the accessory device 14 can be a mechanical power service consumer.

The accessory device 14 may be either directly or indirectly coupled to host 12. Direct coupling occurs when accessory device 14 includes a mechanical power service connector component suitably configured for engaging a corresponding mechanical power service connector component of host 12 to establish a mechanical power service pathway between the host 12 and the accessory device 14. The mechanical power service pathway provides a service pathway for transferring at least one mechanical power service from host 12 to accessory device 14 and from accessory device 14 to host 12.

An adapter 16 may be provided for coupling an accessory device 18 having an incompatible mechanical power service connector component to host 12. A mechanical power service connector component is incompatible if it cannot be directly coupled to a corresponding mechanical power service connector component, such as when the incompatible mechanical power service connector component lacks certain physical features that would enable the mechanical power service connector component to engage the corresponding connector to establish a mechanical power service pathway. Adapter 16 may include a mechanical power service connector component that can be directly coupled with the mechanical power service connector component of host 12 and a second mechanical power service connector component that can be directly coupled with the incompatible mechanical power service connector component of accessory device 18, thereby establishing a mechanical power service pathway between host 12 and accessory device 18. Like the accessory device 14, the adapter 16 can be a mechanical power service consumer.

Although accessory device 14 is shown coupled to an upper surface of host 12, whereas accessory device 18 is shown attached to a front surface of host 12 by way of adapter 16, it shall be appreciated that in practice, accessory device 14 may be suitably configured for coupling to host 12 in any desired location and manner in order to accommodate the design and performance requirements of a particular application, such as on any surface on the exterior or interior an appliance.

Host 12 may perform a primary function. As illustrated herein, host 12 is a refrigerator performing a cooling cycle and/or an ice making cycle. Although the figures show an appliance comprising a refrigerator, it shall be understood that the invention is not limited to refrigerators or appliances in general.

Accessory device 14 and accessory device 18 may also perform at least one primary function. The primary functions of accessory device 14 and accessory device 18 can be different from the primary function performed by host 12, although they need not be.

Host 12 can be configured to communicate at least one mechanical power service to or from accessory device 14 and accessory device 18. Similarly, accessory devices 14 and 18 may also be configured to communicate at least one mechanical power service to or from host 12. It is not necessary that the mechanical power service transferred between host 12 and accessory devices 14 and 18 be used in performing the primary function of host 12 or accessory devices 14 and 18, or otherwise be related to the primary function of either accessory device.

As mentioned previously, in instances where the accessory device includes an incompatible mechanical power service connector component that prevents direct coupling of the accessory device to host 12, adapter 16 may be provided for indirectly coupling the accessory device to host 12. Adapter 16 operates to establish a mechanical power service pathway for transferring the desired mechanical power service between host 12 and accessory device 18 having the incompatible mechanical power service connector component.

At least one mechanical power service can be supplied to accessory devices 14 and 18 from host 12, or from accessory devices 14 and 18 to host 12. The supply of the mechanical power service can be uni-directional in that either host 12 supplies the mechanical power service to accessory devices 14 and 18 or accessory devices 14 and 18 supply the mechanical power service to host 12. The supply of the mechanical power service can also be bi-directional in that the supplied mechanical power service can be delivered from host 12 to accessory devices 14 and 18 and from accessory devices 14 and 18 to host 12.

Mechanical power services that can be transferred between host 12 and accessory devices 14 and 18 may include any mechanical power or motion, such as rotary motion and translational motion. Host 12 may be operating as a mechanical service pathway for transferring a mechanical power service received from an outside source. It shall be appreciated that these are only examples of the various types of mechanical power services that can be transferred between host 12 and accessory devices 14 and 18.

As illustrated, the accessory device 18 is a medicine module. This module may provide convenient access and consumer visibility to a supply of medicine for a consumer and allow controlled dispensing or controlled access to the contents. Additionally, the medicine module may also maintain control of temperature and humidity independently of the host 12 by the use of a fan or compressor system powered by the mechanical power service. It will be appreciated that the medicine module may also include a suitable coupling for communicating cool air, a coolant, or a secondary coolant with host 12.

It will further be appreciated that, while the embodiments in the drawings illustrate specific examples of mechanical power service communicating devices, such as a host 12 that may operate as a mechanical power service provider, an accessory device 14 that may operate as an mechanical power service consumer, and an adapter 16 that may act as a service pathway for the transfer of mechanical power service from host 12 to accessory device 18, variations from this configuration are possible. These variations include systems with only two mechanical power service communicating devices, systems with more than three mechanical power service communicating devices, systems where any of the devices may be mechanical power service consumers and/or mechanical power service providers, systems where multiple services, including, for example electrical power and data, are communicated, and systems where services are received by one device, converted in some manner, and then passed to a third device. Furthermore, in the following description, certain components of service connector systems and proximity systems are described for the illustrative purposes as being associated with specific mechanical power service communicating devices. For example, a proximity switch, target or sensor may be described as being located in a mechanical power service provider, mechanical power service consumer, host, or accessory device. It will be appreciated that these system components may be alternatively assigned to the various mechanical power service communicating devices depending on the application.

Host 12 and accessory device 14 may each comprise at least one mechanical power service connector component, respectively referred to herein as a host mechanical power service connector component 20 and a device mechanical power service connector component 22. Host mechanical power service connector component 20 and device mechanical power service connector component 22 have complementary configurations that enable the mechanical power service connector components to be coupled to one another, thereby establishing a mechanical power service pathway over which desired mechanical power services can be transferred between host 12 and accessory device 14.

Host 12 also has a second host mechanical power service connector component 20 provided on its front surface for a first device mechanical power service connector component 22 provided on the adapter 16. In instances where accessory device 18 includes an incompatible mechanical power service connector component 21 and the adapter 16 is used as an intermediate component to connect accessory device 18 to host 12, adapter 16 may include a second device mechanical power service connector component 23 for engagement with the device mechanical power service connector component 21 of accessory device 18, as well as the first device mechanical power service connector component for connection with the host mechanical power service connector component 20 of host 12. Therefore, mechanical power service connector components 22 may have the same general configuration whether included as part of accessory device 14 or as a part of adapter 16, and mechanical power service connector components 20 may have the same general configuration whether it couples directly with accessory device 14 or adapter 16. Accordingly, for purposes of discussion, the various features and operation of the mechanical power service connector components will hereinafter be described in connection with accessory device 14, but it shall be appreciated that the mechanical power service connector components may also be used in conjunction with adapter 16.

Figure 4:
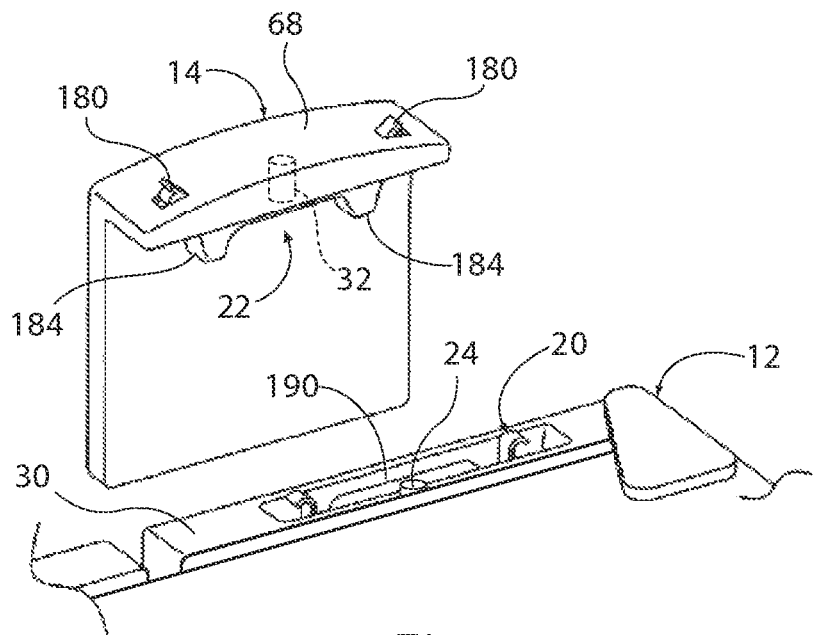
FIG. 4 is partial top rear perspective view of the modular system of FIG. 1, with the accessory device removed from the host, showing a host portion of the mechanically energized mechanical power coupling system.
Figure 5:
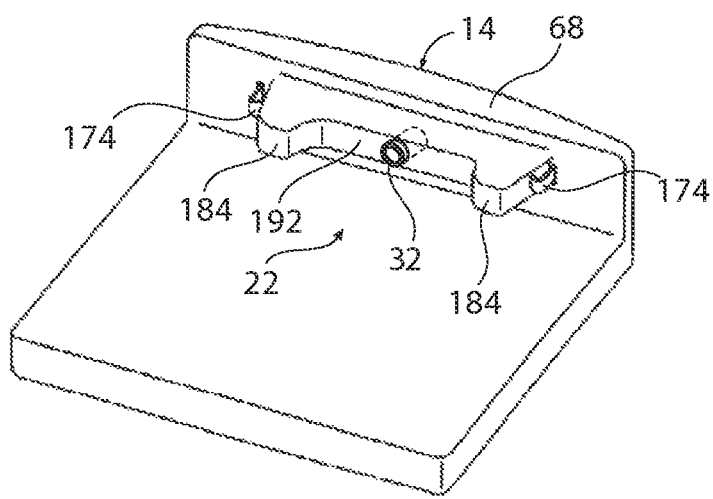
FIG. 5 is bottom perspective view of the accessory device of FIG. 1, showing an accessory device portion of the mechanically energized mechanical power coupling system.

Referring to FIGS. 4 and 5, host mechanical power service connector component 20 can be integrally formed with host 12 or may be an add-on device. Host mechanical power service connector component 20 may be enclosed within a housing 30 of the host 12. Housing 30 may be an integral part of host 12 or may be a separate component. For purposes of discussion, housing 30 is illustrated as an integral part of host 12, and more particularly as part of the door of a refrigerator. When configured as an add-on device, host mechanical power service connector component 20 may also function as an adapter to enable a host and an accessory device having dissimilar mechanical power service connector components to be indirectly coupled to one another. Host mechanical power service connector component 20 may be removable or non-removable from host 12. Host mechanical power service connector component 20 can be configured to transfer or receive a single mechanical power service or multiple mechanical power services.

Device mechanical power connector component 22 can be integrally formed with accessory device 14 or may be an add-on component. As described above, it may be directly integrated into an accessory device or instead integrated into an adapter to which an accessory device is in turn mounted. For purposes of discussion, device mechanical power connector component 22 is shown integrally formed with accessory device 14. When configured as an add-on component, device mechanical power connector component 22 may also function as an adapter to enable a host and a portable device having dissimilar mechanical power coupling systems to be indirectly coupled to one another. Device mechanical power connector component 22 may be removable or non-removable from accessory device 14. Device mechanical power connector component 22 can be configured to transfer or receive a single mechanical power service or multiple mechanical power services and may also be configured to transfer additional services such as electrical power, data, illumination, sound, or heat.

Device mechanical power connector component 22 may be enclosed within a housing 68 of accessory device 14. Housing 68 may be an integral part of accessory device 14 or may be a separate component. For purposes of discussion, housing 68 is illustrated as an integral part of accessory device 14.

Figure 6:
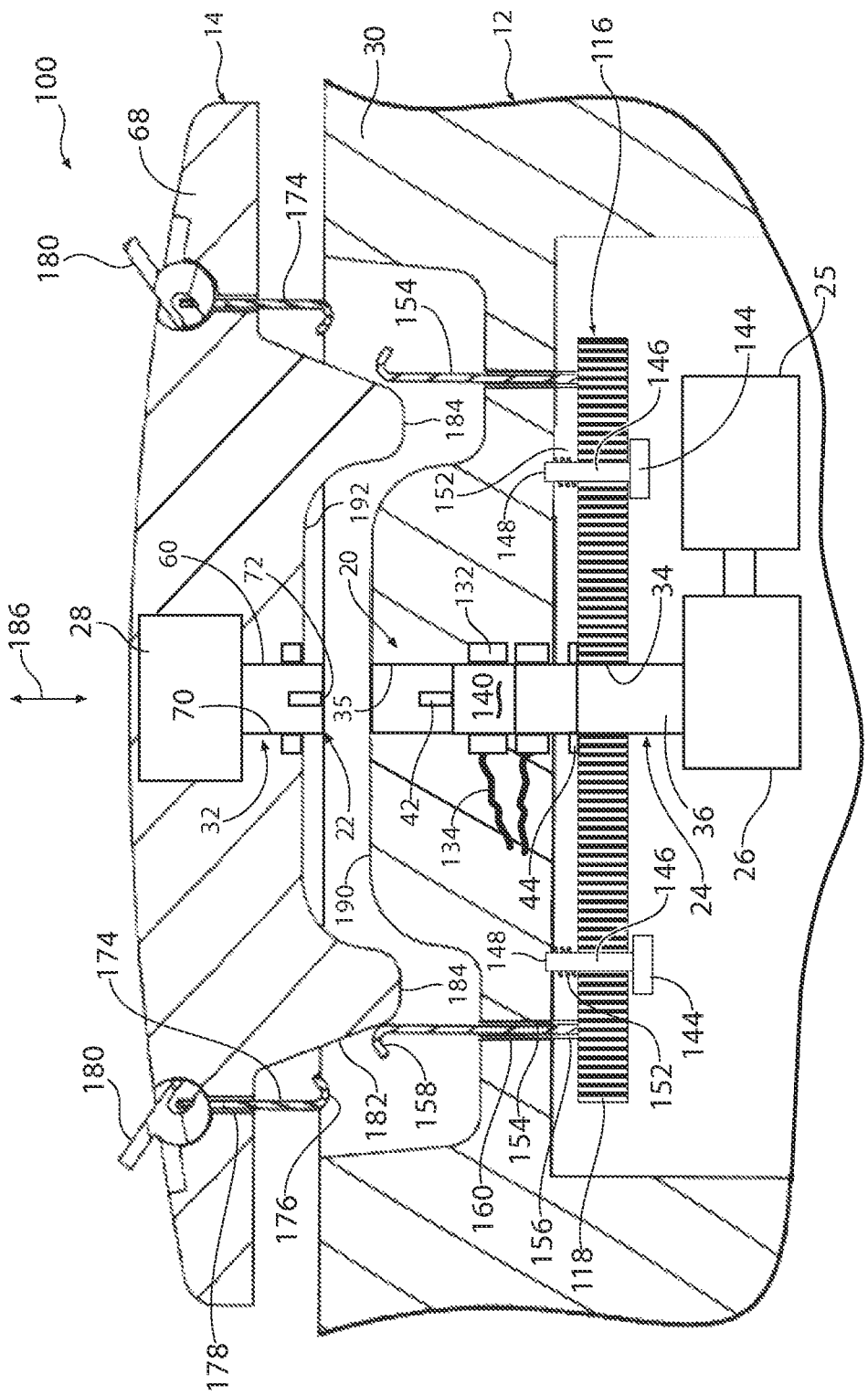
FIG. 6 is a partial cross-sectional view of the mechanically energized mechanical power coupling system of FIG. 1, showing the mechanical power communicating components of the accessory device positioned for engagement with the mechanical power communicating components of the host.

Referring to FIG. 6 a mechanically energized mechanical power coupling system 100 of the modular system 10 is illustrated, and shows accessory device 14 positioned for engagement with host 12. As illustrated, host mechanical power connector component 20 is configured to communicate a single mechanical power service.

Host mechanical power connector component 20 may include a mechanical power service switch 116, such as a mechanically actuated service switch, that can be selectively actuated to establish a mechanical power service pathway between host 12 and accessory device 14 when accessory device 14 is coupled to host 12. In addition, host mechanical power connector component 20 and device mechanical power connector component 22 may also provide a mechanism, described later in detail, for mechanically securing accessory device 14 to host 12.

It should be understood that various mechanical power service switches 116 may be used to control mechanical power service communication from host 12. The selected mechanical power service switch 116 may be designed to fail in a non-communicating condition, such as a normally open switch requiring power to close.

Service switch 116 may be enclosed within housing 30. Service switch 116 includes a switch plate 118 movable between an open position (see FIGS. 6 and 7) and closed position (see FIG. 8), in a manner to be described later in detail, to enable a mechanical power service to be selectively transferred between host 12 and accessory device 14 when accessory device 14 is coupled to host 12. Service switch 116 is generally disposed in the open position when accessory device 14 is decoupled from host 12.

Switch plate 118 is slidably mounted to at least one guide rod 146. An end 148 of guide rod 146 can be fixedly attached to housing 30. An opposite end of guide rod 146 may include a stop 144, which can be sized larger than the opposite end to prevent switch plate 118 from traveling past the stop 144. A biasing member 152 may be disposed between housing 30 and switch plate 118 to urge switch plate 118 toward stop 144. As illustrated herein, a pair of spaced guide rods 146 mounts the switch plate 118.

Service switch 116 further includes at least one host actuating link 154 fixedly attached to switch plate 118 at one end 156 of actuating link 154. Actuating link 154 extends from switch plate 118 through an aperture 160 in housing 30 and has a hook shaped portion 158 disposed at its distal end outside of the housing 30. Hook shaped portion 158 allows actuating link 154 to selectively connect to a corresponding actuating link 174, described below, associated with accessory device 14. Sufficient clearance is provided between host actuating link 154 and aperture 160 to allow host actuating link 154 to move freely in and out of the housing and thereby move switch plate 118 to move along passageway guide rod 146. Host actuating link 154 may be constructed of a flexible material having a relatively high modulus of elasticity, such as spring steel, or another generally flexible material having similar mechanical properties.

Host 12 may be associated with a mechanical power service provider 26, provided with a controller 25, for selectively providing a mechanical power service via a mechanical service pathway 24 to host mechanical power service connector component 20 for delivery to device mechanical power service connector component 22. Accessory device 14 may similarly be provided with a mechanical power service consumer 28 capable of receiving, via a mechanical power service pathway 32, the mechanical power service delivered to device mechanical power service connector component 22, and using the mechanical power.

It will be appreciated that, in addition to providing pathways and interfaces for mechanical power service, accessory device 14 and host 12 may be configured to provide additional service communication features, not shown, for communicating other services such as one or more electrical contacts connected by electrical wires to an electrical power consumer or provider. As further examples, they may have fiber optic interfaces, or complimentary substance communication couplings.

Host mechanical power service pathway 24 is operably connected to mechanical power service provider 26 and is operable for communicating a mechanical power service from mechanical power service provider 26 for delivery to accessory device 14. In the structure shown in FIG. 6, mechanical power service provider 26 may be a motor disposed with housing 30 of host 12 and may provide rotational movement as an output. Host mechanical power service pathway 24 include a shaft 36 having a distal end operably connected to the mechanical power service provider 26 and receiving rotational mechanical power therefrom, and an intermediate portion extending through a passageway 34 through service switch 116 and through a passageway 35 in housing 30. The proximal end of shaft 36 is provided with a coupling feature, such as a male keyed end 42.

Shaft 36 is rotatable relative to switch plate 118 and longitudinally displaceable by service switch 116, for example, by a bearing ring 44 disposed between shaft 36 and switch plate 118. Shaft 36 is freely translatable along passageway 35 to selectively move male keyed end 42 into and out of engagement positions, described below, when switch plate 118 is displaced. Shaft 36 may also be longitudinally moveable relative to mechanical power service provider 26, as shown in FIG. 9, by being longitudinally displaceable from a driving component 46, represented by a gear, of mechanical power service provider 26, but being constrained to rotate with driving component 46 by one or more transverse keys 48.

A proximity sensor, such as electrical contacts 132, may be provided in housing 30 and extend into passageway 35 to sense the position of shaft 36. For example, housing 30 may be made of dielectric material and electrical contacts 132 may be spaced apart rings of conductive material molded into housing 30. Each of the electrical contacts 132 may be connected by an electrical line 134 to a control circuit, not shown, responsive to the creation of an electrical connection between electrical contacts 132 to operate a mechanical power service communication regulating component, such as controller 25 capable of selectively inhibiting the communication of mechanical power service from mechanical power service provider 26 to host service pathway 24. It should be understood that the chosen mechanical power service communication regulating component may be configured to stop mechanical power service communication through service pathway 24 if there is a failure of the control apparatus associated with the mechanical power service communication regulating component. For example, if the mechanical power service communication regulating component is an electrical switch, it should be a normally open switch such that if there is a failure in the control circuit, the system will fail such that mechanical power service will not be communicated. If the mechanical power service communication regulating component is controller 25, then the logic in controller 25 may be designed to prevent the operation of mechanical power service provider 26 unless a signal is present that a accessory device 14 is properly coupled to host 12.

A proximity target, such as a conductive surface 140 formed on the exterior of host service pathway 24, is selectively engageable with the electrical contacts 132 to complete a circuit between the electrical contacts 132 and thereby permit the proximity sensor to detect the repositioning of the shaft 36 in the passageway 35 and provide a control signal to controller 25. Host service pathway 24 may be formed of a dielectric material and conductive surface 140 may be formed from a conductive foil or coating applied to the exterior surface of host service pathway 24 or a conductive ring molded into host service pathway 24.

Device mechanical power connector component 22 is integrally formed with accessory device 14 and is configured to communicate a single mechanical power service. Device mechanical power connector component 22 is enclosed within a housing 68. Housing 68 is an integral part of accessory device 14.

Device mechanical power connector component 22 may include a device mechanical power service pathway 32 operable for transferring a mechanical power service to or from accessory device 14. As shown schematically in FIG. 6, device service pathway 32 is in communication at one end with mechanical power service consumer 28. Device service pathway 32 is fitted through an aperture 70 in housing 68 and terminates in an exposed end disposed outside of housing 68.

For example, device service pathway 32 may comprise a shaft 60 terminating in a female keyed end 72. Device service pathway 32 is coupled to housing 68 so as to stay with housing 68. However, device service pathway 32 includes a component which is moveable relative to housing 68 to deliver power, such as rotational power. For example, shaft 60 may be constrained to rotate within aperture 70. It will be appreciated that the keyed end 72 cooperates with portions of housing 68 to form a plug engageable with the receptacle formed by the cooperation the keyed end 42 with housing 30.

Device mechanical power connector component 22 may include at least one device actuating link 174 that can connect to host actuating link 154 of host mechanical power connector component 20 when accessory device 14 is coupled to host 12. Device actuating link 174 may include a hook-shaped portion 176 that can be coupled to the correspondingly hook-shaped potion 158 of host actuating link 154. An end 178 opposite the hook-shaped portion 176 can be operably connected to a toggle switch 180, or similar device. Toggle switch 180 can be moved between a latched position, shown in FIG. 8, and an unlatched position, shown in FIGS. 6 and 7.

Figure 7:
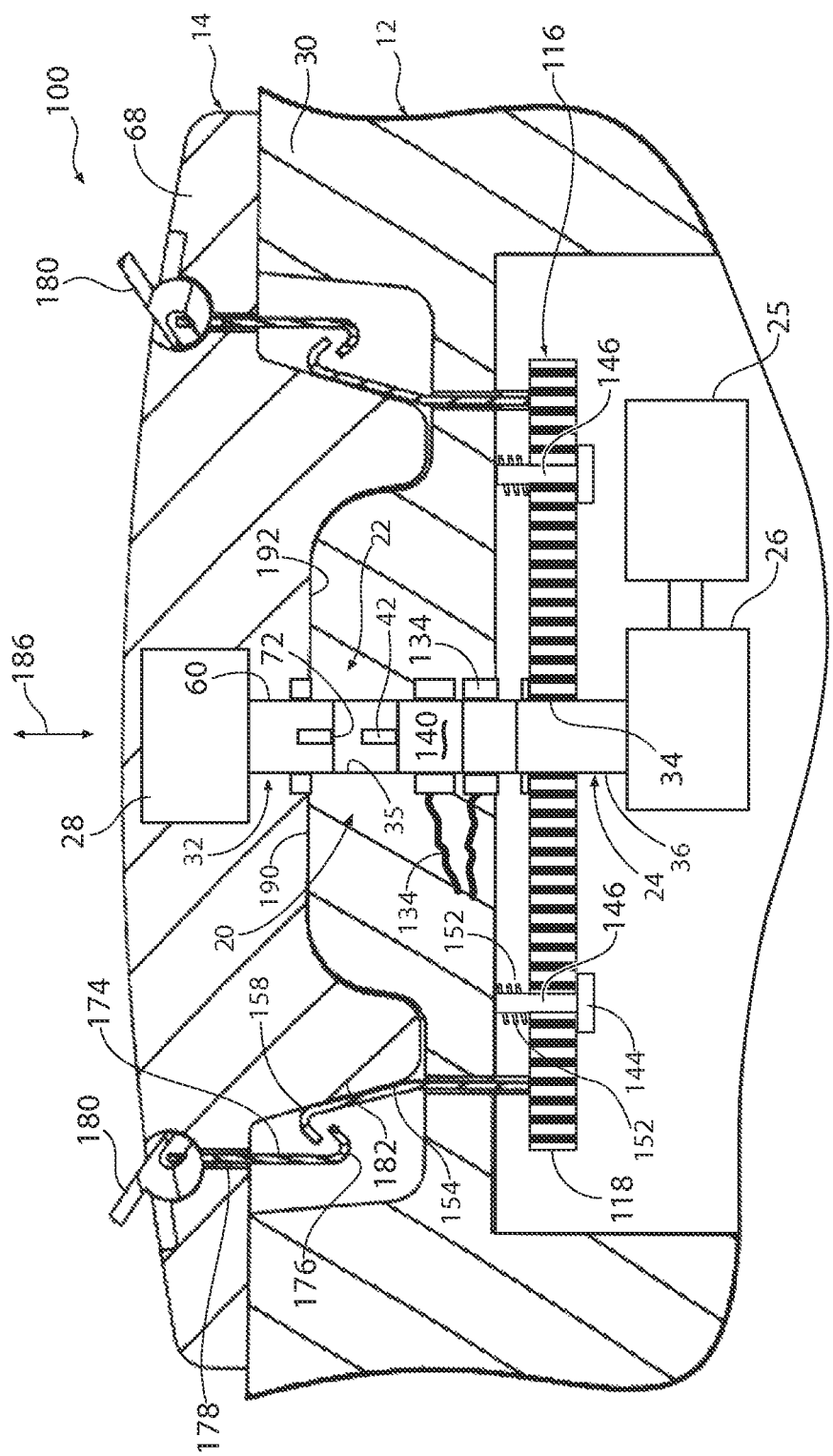
FIG. 7 is a partial cross-sectional view similar to FIG. 6, showing the mechanical power communicating components of the accessory device engaged with the mechanical power communicating components of the host in an unlatched state.

Referring generally now to FIGS. 6, 7 and 8, it will be appreciated that host mechanical power connector component 20 and device mechanical power connector component 22 may include various geometric features to facilitate coupling of accessory device 14 to host 12. For example, host mechanical power connector component 20 may include a raised boss 190 that can engage a corresponding recess 192 of device mechanical power connector component 22. A raised ridge 184 at least partially defines an outer boundary of recess 192. Alignment features such as boss 190 and recess 192 may assist with positioning of device mechanical power service communication connector component 22 relative to host mechanical power connector component prior to engagement, and may also function to minimizing lateral movement of accessory device 14 relative to host 12 when device mechanical power connector component 22 is coupled to host mechanical power connector component 20. It shall be appreciated, however, that the illustrated configuration is merely one example of the type of features that may be incorporated into host mechanical power connector component 20 and device mechanical power connector component 22 to aid alignment and coupling of accessory device 14 to host 12. In practice, other configurations may also be employed to accommodate various design considerations of a particular application.

To facilitate coupling and decoupling of device actuating link 174 with host actuating link 154, device actuating link 174 can be offset laterally relative to host actuating link 154 to allow hook-shaped portion 176 of device actuating link 174 to clear hook-shaped portion 158 of the host actuating link 154 when accessory device 14 is attached to host 12. For example, referring particularly to FIG. 6, with accessory device 14 positioned for engagement with host 12, hook-shaped portion 158 of host actuating link 154 is initially offset from hook-shaped portion 176 of device actuating link 174. As device mechanical power connector component 22 is moved into engagement with host mechanical power connector component 20, as shown in FIG. 7, hook-shaped portion 158 of device actuating link 154 engages an outer surface 182 of ridge 184. Surface 182 is inclined relative to an engagement path denoted by arrow 186. Arrow 186 depicts a path along which accessory device 14 can be moved when coupling and decoupling accessory device 14 to and from host 12. Further movement of device mechanical power connector component 22 toward host mechanical power connector component 20 causes hook-shaped portion 158 of host actuating link 154 to travel along inclined surface 182, which in turn elastically displaces hook-shaped portion 158 of host actuating link 154 toward hook-shaped portion 176 of device actuating link 174. With device mechanical power connector component 22 fully engaged with host mechanical power connector component 20 (see FIG. 7), hook-shaped portion 158 of host actuating link 154 is sufficiently displaced from its decoupled position (as shown in FIG. 6) so as to axially overlap hooked-shaped portion 176 of device actuating link 174. Moving toggle switch 180 from the unlatched to the latched position retracts device actuating link 174, as shown in FIG. 8.

The process is reversed when disengaging accessory device 14 from host 12. As device mechanical power connector component 22 is disengaged from host mechanical power connector component 20, hook-shaped portion 158 of host actuating link 154 slides along inclined surface 182 and is moved out of alignment with hooked-shaped portion 176 of device actuating link 174, as shown in FIG. 6. Moving toggle switch 180 from the latched position to the unlatched position causes device actuating link 174 to be extended. Device actuating link 174 may be constructed of a similar material as host actuating link 154.

Coupling of accessory device 14 to host 12 can be accomplished by positioning accessory device 14 adjacent host 12 in such a manner that device mechanical power connector component 22 is generally aligned with host mechanical power connector component 20, as shown in FIG. 6. Device mechanical power connector component 22 and host mechanical power connector component 20 can be coupled together by generally moving accessory device 14 toward host 12 along the path indicated by arrow 186 until the two members are fully seated, as shown in FIG. 7. With device mechanical power connector component 22 fully engaging host mechanical power connector component 20, keyed end 72 of device service pathway 32 aligns with keyed end 42 of host service pathway 24. However, since service switch 116 has not yet been activated, the mechanical power service communication path between accessory device 14 and host 12 remains incomplete and the supply of mechanical power service to host service pathway 24 remains closed.

Service switch 116 can be activated by moving toggle switch 180 to the latched position, as shown in FIG. 8. Doing so causes hook-shaped portion 176 of device actuating link 174 to engage hook shaped portion 158 of host actuating link 154, which in turn results in host actuating link 154 being pulled toward accessory device 14 by device actuating link 174. Switch plate 118 and host service pathway 24 are pulled along with device actuating link 174 and host actuating link 154 towards housing 68, causing keyed end 72 of shaft 60 to engage with keyed end 42 of host service pathway 24, effectively completing the formation of a mechanical power service communication path between accessory device 14 and host 12.

Furthermore, as host service pathway 24 is advanced into engagement with device service pathway 32, the proximity sensor, represented by electrical contacts 132 on the inner walls of passageway 35, is engaged by the proximity target, represented by the conductive surface 140 on the exterior of host service pathway 24 to complete a circuit and provide a control signal to open and permit the communication of mechanical power service from the mechanical power service provider 26.

It should be noted that service switch 116 is intended to selectively permit or inhibit communication of mechanical power service from the mechanical power service provider 26 to the host service pathway 24 based on the presence of a proximity target associated with host service pathway 24, or the switch plate 118 by a proximity sensor associated with the housing 30, and that alternative sensors and targets may be used for this purpose. It should further be noted that the proximity sensor is intended to deliver a signal or message selectively permitting or selecting inhibiting the communication of mechanical power service to host service pathway 24 and that the signal represented in the drawings and described above as the completion of an electrical circuit is merely exemplary of various signals or messages that may be used for this purpose. It should also be noted that additional switches, sensors and controls, besides those represented in the drawings and described herein, may be provided to further regulate the communication of mechanical power service based on the needs of the user of the accessory device 14.

Accessory device 14 can be decoupled from host 12 by reversing the previously described process for coupling the two devices together. For example, service switch 116 can be moved to the open position by cycling toggle switch 180 from the latched position (see FIG. 8) to the unlatched position, as shown in FIG. 7. Doing so extends device actuating link 174 and allows biasing member 152 to move switch plate 118 toward stop 144 of guide rod 146. Further movement of switch plate 118 away from accessory device 14 causes keyed end 42 of shaft 36 to disengage keyed end 72 of shaft 60, thereby interrupting the mechanical power service communication path between accessory device 14 and host 12 (see FIG. 7). Switch plate 118 stops moving upon contacting stop 144 of guide rod 146. Once toggle switch 180 has been moved to the unlatched position, accessory device 14 can be removed from host 12 by withdrawing accessory device 14 from host 12 along a path generally parallel to arrow 186. Furthermore, as host service pathway 24 is retracted from engagement with device service pathway 32, the proximity sensor acts to inhibit or prevent an electrical switch from opening to permit the communication of mechanical power service from the mechanical power service provider 26.

For purposes of discussion, host mechanical power service pathways 24 and 32 are described and illustrated generically as rotating shafts. Alternative configurations may be used, such as translating belts, cable, or chains, with the choice depending on, at least in part, the type of mechanical power service required, the loads or pressures involved, the footprint of the devices involved, and manufacturing considerations.

Referring to FIGS. 10 through 16, alternative mechanical power connector components for an accessory device and a host according to further embodiments of the invention are schematically illustrated.

As illustrated in FIGS. 10 and 11, a host 212 having a housing 230 and an accessory device 214 having a housing 268 may transfer mechanical power between respective mechanical power service connector components 220 and 222 comprising shafts having toothed clutch plates 274 and 242 formed on respective proximate ends of shafts 264 and 236. Toothed clutch plates 242 and 274 function similarly to the keyed ends 42 and 72 of shafts 36 and 60, described above with reference to FIGS. 6 through 8, except that their large interengaged surface areas permit the toothed clutch plates to communicate more torque and accommodate more shock than the keyed ends. A biasing member, such as a spring 290, may provided in an enlarged bore 240 in at least one housing 230 or 268 to bias one of the toothed clutch plates 242 and 274 into engagement with the other toothed clutch plate to provide a reliable connection while accommodating tolerance accumulation and vibration.

One or more cables 254 extend from a touch point on the underside of toothed clutch plate 242, such as a bearing surface (not shown), through one or more U-shaped channels 256 through housing 230, and extend outward from housing 230 such as to be engageable by housing 268 of accessory device 214. Housing 268 may engage cables 254 and thereby drive toothed clutch plate 242 exteriorly of housing 30 and into engagement with toothed clutch plate 274.

As illustrated in FIGS. 12 and 13, a host 212' and an accessory device 214' may transfer mechanical power between respective mechanical power service connector components 220' and 222' comprising shafts 236' and 264' respectively having flat clutch plates 242' and 274' formed on respective proximate ends of shafts 236' and 264'. Flat clutch plates 242' and 274' function similarly to the toothed clutch plates 242 and 274 described above with reference to FIGS. 10 and 11, except that clutch plates 242' and 274' use rough surfaces rather than teeth for inter-engagement. The rough surface permits some slippage between the clutch plates 242' and 274', which may be desirable for some applications. Furthermore, clutch plates 242' and 274' are not as sensitive to initial alignment as are the teethed clutch plates 242 and 274, described above. A biasing member, such as a spring 290', may provided to bias one of the flat clutch plates 242' and 274' into engagement with the other flat clutch plates to provide a reliable connection while accommodating tolerance accumulation and vibration.

As mentioned above, it is contemplated that mechanical power may be communicated using means other than rotating shafts. FIGS. 14, 15 and 16 illustrate mechanical power connector components where mechanical power is at least partially communicated using a translating belt.

As illustrated schematically in FIGS. 14 and 15, a host 312 and an accessory device 314 may transfer mechanical power between respective mechanical power service connector components 320 and 322. Host 312 may communicate mechanical power from a mechanical power source, not shown, by way of a mechanical service pathway 332 comprising a translating belt having a portion extended about a shaft 302 disposed in a bore 340 in a housing 330 of the host 312. The belt may have a grooved surface, not shown, engaging a similarly grooved surface on the exterior of the shaft. It will be apparent that, as desired for certain applications, a cable and pulley or a chain and gear system may be substituted for the belt and grooved surface system described. Shaft 302 is rotatably mounted at each end to housing 330 of host 312, such as by supports 304 mounted to the base of bore 340. A wheel 306 having a circumferentially disposed engagement surface 308, such as a frictional surface or gear teeth, is fixedly secured to shaft 302 for rotation therewith.

Accessory device 314 may similarly communicate mechanical power to a mechanical power consumer, not shown, by way of a mechanical service pathway 334 comprising a translating belt having a portion extended about a shaft 338 disposed in a bore 372 in a housing 368 of accessory device 314. Shaft 338 is rotatably mounted at each end to housing 368 of accessory device 314, such as by supports 390, which are, in turn, slidably supported on pins 392 mounted to the base of bore 372. A biasing member, such as a spring 394, may surround each pin 392 and bias shaft 338 away from the base of bore 372 against a stop, not shown, provided on pins 392 to limit the movement of the shaft 338. A wheel 396 having a circumferentially disposed engagement surface 398, such as a frictional surface or gear teeth, is fixedly secured to shaft 338 for rotation therewith.

When accessory device 314 is coupled with host 312, the respective engagement surfaces 308 and 398 of wheels 306 and 396 engage to permit the communication of mechanical power therebetween. Springs 394 maintain a reliable coupling between wheels 306 and 396 and accommodate a tolerance accumulation and vibration between accessory device 314 and host 312.

As mentioned above, it is contemplated that mechanical power may be communicated between devices using dissimilar types of mechanical power. In some cases, mechanical power may be transmitted using one type of power and then converted, such as by an adapter, to a different type of mechanical power. It is also contemplated that some conversion may occur at the coupling between a host and an accessory device.

FIG. 16 schematically illustrates mechanical power connector components, wherein one of the components uses a rotating shaft while the other component uses a translating belt. For example, a host 212' of the type shown in FIGS. 12 and 13, may be coupled to an accessory device 314 of the type shown in FIGS. 14 and 15, such that engagement surface 398 of wheel 396 of accessory device 314 engages the flat clutch plate 242' of host 212' to communicate mechanical power therebetween.

It will be appreciated that still further variations are possible. For example, flat clutch plate 242' may be replaced with a beveled gear and wheel 396 may have a complementary beveled gear. Alternatively, wheel 396 may be keyed to shaft 338 and be selectively displaceable along shaft 338 to provide a variable transmission between the components at the coupling.

Figure 17:
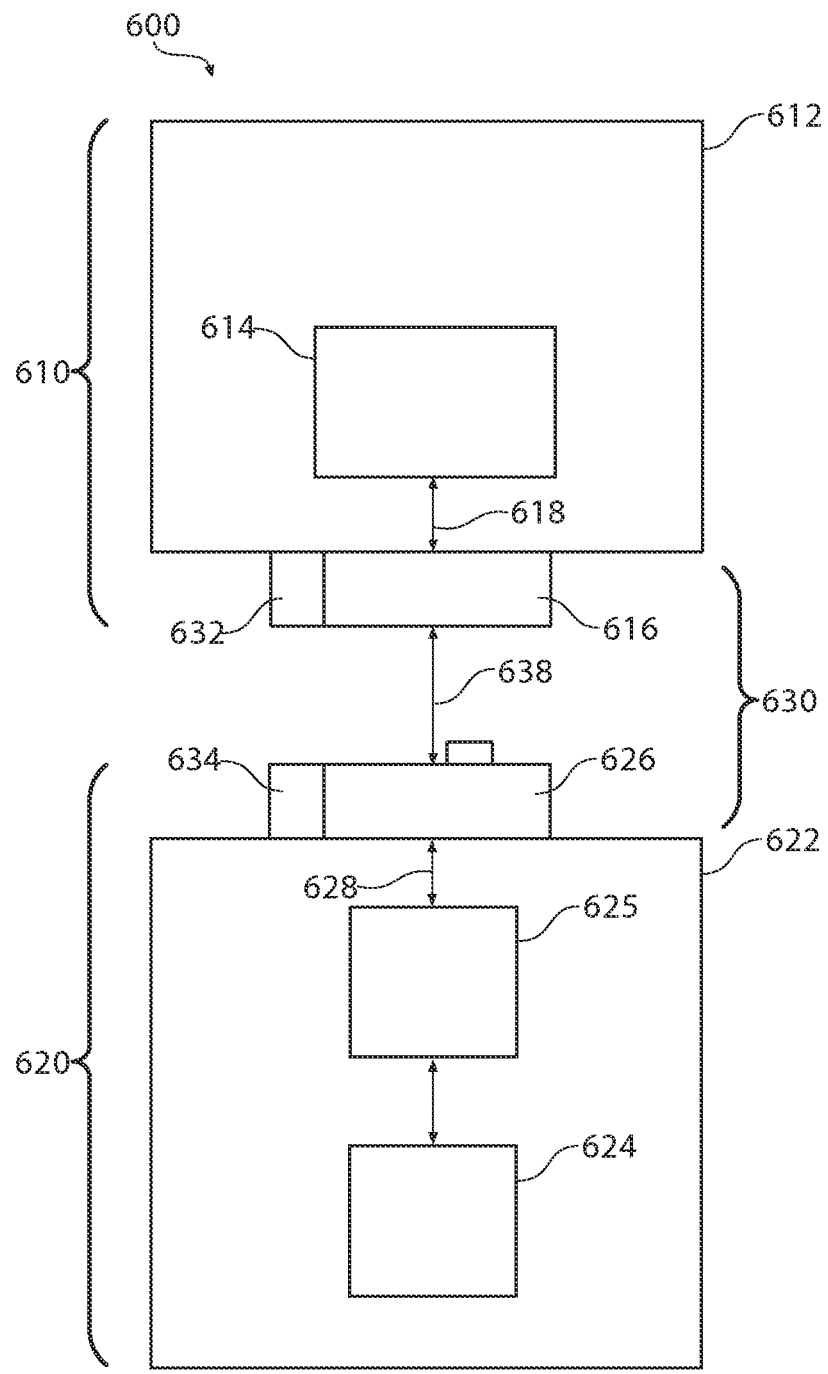
FIG. 17 is a schematic illustration of a mechanical power service supply and consumption system.

Referring now to FIG. 17, a more general example of a mechanical power service supply and consumption system 600 is schematically illustrated. A first subsystem 610 is connectable to a second subsystem 620 for selectively transferring a mechanical power service between the subsystems 610 and 620. As illustrated, first subsystem 610 may include an accessory device 612, such as a portable device, having a mechanical power service consumer 614 connected to a first connector component, such as a plug 616, by a mechanical power service communication service pathway 618. Second subsystem 620 may include a host 622, such as a refrigerator, including a mechanical power service provider 624 connected to a second connector component, such as a receptacle 626, through a switch 625 by mechanical power service communication service pathway 628.

A coupler system 630 includes plug 616 and receptacle 626, which are selectively interengageable. Switch components 632 and 634 are respectively associated with the plug 616 and the receptacle 626 to selectively activate the switch 625 when the plug 616 and receptacle 626 are engaged to permit the communication of the mechanical power service from the mechanical power service provider 624 to the receptacle 626, then along a mechanical power service communication service pathway 638 between receptacle 626 and plug 616, and then along mechanical power service communication service pathway 618 to mechanical power service consumer 614.

It will be appreciated that while host 622 is illustrated as including a mechanical power service provider 624 and accessory device 612 is illustrated as including a mechanical power service consumer, accessory device 612 may be alternatively or additionally include a mechanical power service provider and host 622 may alternatively or additionally include a mechanical power service consumer. It will further be appreciated that while plug 616 is illustrated as being associated with mechanical power service consumer 614 and receptacle 626 is illustrated as being associated with mechanical power service provider 624, it is contemplated that plug 616 and receptacle 626 may be either male or female coupler components so long as the components are capable of interengaging to permit the transfer of mechanical power service therebetween.

With regard to the processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

It is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In summary, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A mechanical power coupling system comprising:
   a first service connector component;
   a service switch operably connected to a mechanical power service source, the service switch operable for selectively transferring a mechanical power service from the mechanical power service source to the first service connector component, the service switch including a first link moveably associated with the service switch; and
   a second service connector component operably connectable to the first service connector component, the second service connector component including a second link associated with the second service connector component and engageable with the first link of the service switch;
   wherein the service switch is selectively activated to transfer a mechanical power service from the first service connector component to the second service connector component in response to movement of the first link when engaged with the second link; and
   wherein the second link is moveable relative to the second service connector component between an extended position and a refracted position by movement of the first link when the first link is engaged with the second link, wherein the service switch is activated to transfer the mechanical power service from the mechanical power service source to the second service connector component when the second link is in the retracted position.

2. The system according to claim 1 and further comprising a mechanical power service communication service pathway for selectively transferring the mechanical power service from the mechanical power service source to the first service connector component, the mechanical power service communication service pathway movable between a first position in which the mechanical power service communication service pathway is operably coupled to the first service connector component and a second position in which the mechanical power service communication service pathway is operably decoupled from the first service connector component, wherein the mechanical power service communication service pathway is arranged in the second position when the second service connector component is decoupled from the first service connector component.

3. The system according to claim 2 and further comprising a biasing member connected to the mechanical power service communication service pathway, the biasing member operable for urging the mechanical power service communication service pathway toward the second position.

4. The system according to claim 1 and further comprising a mechanical power service communication service pathway for selectively transferring the mechanical power service from the mechanical power service source to the first service connector component, the mechanical power service communication service pathway connected to the first link for concurrent movement therewith, wherein the mechanical power service communication service pathway is operably coupled to the first service connector component when the second link is in the retracted position.

5. The system according to claim 4, wherein the mechanical power service communication service pathway is operably decoupled from the first service connector component when the second link is in the extended position.

6. The system according to claim 4, wherein the first service connector component includes a first end enclosed within a housing and operably engageable with the mechanical power service communication service pathway, and a second end accessible from outside of the housing.

7. The system according to claim 1, wherein the service switch is deactivated to substantially prevent communication of the mechanical power service from the mechanical power service source to the first service connector component when the first link is detached from the second link.

8. The system according to claim 1, wherein the service switch is deactivated to substantially prevent communication of the mechanical power service from the mechanical power service source to the first service connector component when the second service connector component is decoupled from the first service connector component.

9. The system according to claim 1 and further comprising a host configured to communicate the mechanical power service to the first service connector component.

10. The system according to claim 9, wherein the host comprises at least one of a refrigerator, a freezer, a conventional oven, a microwave oven, a dishwashing machine, a stove, a range, an air conditioner, a dehumidifier, a clothes washing machine, a clothes dryer, a clothes refreshing machine, a non-aqueous washing apparatus, a water softener, a water heater, a furnace, pool water treatment equipment, an HVAC system, a thermostat, a blender, a mixer, a toaster, a coffee maker, a trash compactor, an air purifier, an iron, a vacuum cleaner, a robot, and a structural feature of a building.

11. The system according to claim 9 and further comprising a mechanical power service consumer configured to communicate at least one mechanical power service with the host.

12. A mechanical power coupling system comprising:
a first service connector component;
a service switch operably connected to a mechanical power service source, the service switch operable for selectively transferring a mechanical power service from the mechanical power service source to the first service connector component, the service switch including a first link moveably associated with the service switch; and
a second service connector component operably connectable to the first service connector component, the second service connector component including a second link associated with the second service connector component and engageable with the first link of the service switch;
wherein the service switch is selectively activated to transfer a mechanical power service from the first service connector component to the second service connector component in response to movement of the first link when engaged with the second link;
wherein the second link is fixed relative to the second service connector component, and wherein the service switch is activated to transfer the mechanical power service from the mechanical power service source to the second service connector component when the second link is engaged with the first link and the first link is moved; and
wherein the movement of the first link draws the first service connector component and second service connector component into engagement.

13. The system according to claim 12, wherein the service switch comprises a proximity switch activated when the first service connector component and second service connector component are drawn into engagement by the first link.

14. The system according to claim 12, wherein at least one of the second service connector component and first service connector component has a proximity target and the other of the second service connector component and first service connector component has a proximity sensor responsive to the proximity sensor when the first service connector component and second service connector component are drawn into engagement by the first link.

15. A system for coupling with a mechanical power service communicating device, the system comprising:
a first service connector component operably engageable with a separate second service connector component for transferring a mechanical power service from a mechanical power service source to the second service connector component; and
a service switch for selectively connecting the first service connector component to the mechanical power service source, the service switch including a first link engageable with a second link associated with the second service connector component;
wherein the service switch is activated to transfer a mechanical power service from the mechanical power service source to the first service connector component in response to movement of the first link;
wherein the movement of the first link draws the first service connector component and second service connector component into engagement.

16. The system according to claim 15, wherein the service switch comprises a proximity switch activated when the first service connector component and second service connector component are drawn into engagement by the first link.

17. The system according to claim 15, wherein at least one of the second service connector component and first service connector component has a proximity target and the other of the second service connector component and first service connector component has a proximity sensor responsive to the proximity sensor when the first service connector component and second service connector component are drawn into engagement by the first link.

18. A system for receiving a mechanical power service from a host comprising a mechanical power coupling system, the system comprising:
a second service connector component operably engageable with a separate first service connector component for selectively receiving a mechanical power service from a mechanical power service source; and
an actuator operably associated with the second service connector component, the actuator moveable along a path generally parallel to an axis of insertion of the second service connector component with the first service connector component, between a first position and a second position, wherein the actuator comprises:
at least one link engageable with a corresponding link associated with the first service connector component, the at least one link moveable between an extended position and a retracted position; and
a switch operably connected to the at least one link, the switch selectively moveable between a latched position, in which the switch positions the at least one link in the retracted position, and an open position, in which the switch positions the at least one link in the extended position;
wherein the mechanical power service is delivered to the second service connector component when the actuator is in the first position.

19. The system according to claim 18, wherein the at least one link includes a hook-shaped portion engageable with the first service connector component.

20. The system according to claim 18, wherein the at least one link includes a hook-shaped portion engageable with the corresponding link of the first service connector component.

21. The system according to claim 18, wherein a longitudinal axis of the at least one link is aligned substantially parallel to the axis of insertion.

22. The system according to claim 18, wherein the at least one link is moveable substantially parallel to a longitudinal axis of the at least one link.

23. The system according to claim 18, wherein the at least one link comprises at least two links and the second service connector component is disposed between the at least two links.

24. The system according to claim 18 and further comprising a mechanical power service consumer in communication with the second service connector component.

25. The system according to claim 18, wherein the movement of the at least one link draws the first service connector component and second service connector component into engagement.

26. The system according to claim 25, wherein the switch comprises a proximity switch activated when the first service connector component and second service connector component are drawn into engagement by the at least one link.

27. The system according to claim 25, wherein at least one of the second service connector component and first service connector component has a proximity target and the other of the second service connector component and first service connector component has a proximity sensor responsive to the proximity sensor when the first service connector component and second service connector component are drawn into engagement by the at least one link.

28. The system according to claim 18 and further comprising a mechanical power service consumer configured to communicate at least one mechanical power service with the host.

29. The system according to claim 28, wherein the mechanical power service consumer is at least one of a consumer electronic device, a client software device, a remote user interface, a source of consumer of information, a reader, a sensor device, a smart utensil, an appliance, an additional smart coupling device, a remote controller, a network binder, a cycle accessory, a resource controller, a communicator, an access system, a payment system, a sales demonstration device, a consumable holder, a dispenser, a filter, a water filter, an air filter, a detergent dispenser, a drink dispenser, a detergent cartridge, a media content holder, and a mechanical power service device.

* * * * *